US008935625B2

(12) United States Patent
 Alonso Lago

(10) Patent No.: US 8,935,625 B2
(45) Date of Patent: Jan. 13, 2015

(54) USER INTERFACE FOR TASK MANAGEMENT

(75) Inventor: Martin Luis Alonso Lago, Brooklyn, NY (US)

(73) Assignee: Conductor, Inc., New York, NY (US)

( * ) Notice: Subject to any disclaimer, the term of this patent is extended or adjusted under 35 U.S.C. 154(b) by 287 days.

(21) Appl. No.: 13/586,502

(22) Filed: Aug. 15, 2012

(65) Prior Publication Data

US 2014/0053096 A1 Feb. 20, 2014

(51) Int. Cl.
  *G06F 3/048* (2013.01)
  *G06F 3/00* (2006.01)
  *G06F 3/0481* (2013.01)

(52) U.S. Cl.
  CPC .......... *G06F 3/0481* (2013.01); *G06F 3/04817* (2013.01)
  USPC ............................. 715/772; 715/781; 715/716

(58) Field of Classification Search
  CPC ........................... G06F 3/0481; G06F 3/04817
  USPC .......................................... 715/772, 781, 716
  See application file for complete search history.

(56) References Cited

U.S. PATENT DOCUMENTS

| | | | | |
|---|---|---|---|---|
| 6,854,088 B2 * | 2/2005 | Massengale et al. | ......... | 715/764 |
| 6,901,558 B1 * | 5/2005 | Andreas et al. | ................ | 715/772 |
| 7,302,401 B1 * | 11/2007 | Tervonen | ..................... | 705/7.17 |
| 7,603,618 B2 * | 10/2009 | Mori et al. | .................... | 715/229 |
| 7,826,607 B1 * | 11/2010 | de Carvalho Resende et al. | ............................. | 379/225 |
| 7,904,321 B2 * | 3/2011 | Moore et al. | ................. | 705/7.18 |
| 7,921,026 B2 * | 4/2011 | O'Cull et al. | ................ | 705/7.23 |
| 8,183,712 B2 * | 5/2012 | MacLellan et al. | ............ | 307/35 |
| 8,191,004 B2 * | 5/2012 | Chandrasekar et al. | ...... | 715/769 |
| 8,707,219 B2 * | 4/2014 | Ding | ............................ | 715/867 |
| 8,738,665 B2 * | 5/2014 | Hunter et al. | ................. | 707/805 |
| 8,769,426 B2 * | 7/2014 | Brian et al. | .................... | 715/772 |
| 2013/0239040 A1 * | 9/2013 | Kaleta et al. | .................. | 715/772 |
| 2013/0246962 A1 * | 9/2013 | Kaleta et al. | .................. | 715/772 |
| 2013/0262527 A1 * | 10/2013 | Hunter et al. | ................. | 707/805 |

OTHER PUBLICATIONS

Gantt Chart, Wikipedia, http://en.wikipedia.org/wiki/Gant_chart, accessed on Oct. 23, 2012, 4 pages.

* cited by examiner

*Primary Examiner* — David Phantana Angkool
(74) *Attorney, Agent, or Firm* — Moritt Hock & Hamroff LLP; Steven S. Rubin, Esq.

(57) ABSTRACT

Systems and methods to generate user interface data effective to display representations of tasks. A processor may receive first and second task details relating to first and second tasks. The details may include respective durations and end times. In response, the processor may generate the user interface data including a chart. The chart may include an indication of a current time, a first representation of the first task and a second representation of the second task. The first representation includes a first bar with a first length corresponding to the first task duration. The first bar includes a first highlight indicating whether the first end time is prior to the current time. The second representation includes a second bar with a second length corresponding to the second task duration. The second bar includes a second highlight indicating whether the second end time is prior to the current time.

20 Claims, 7 Drawing Sheets

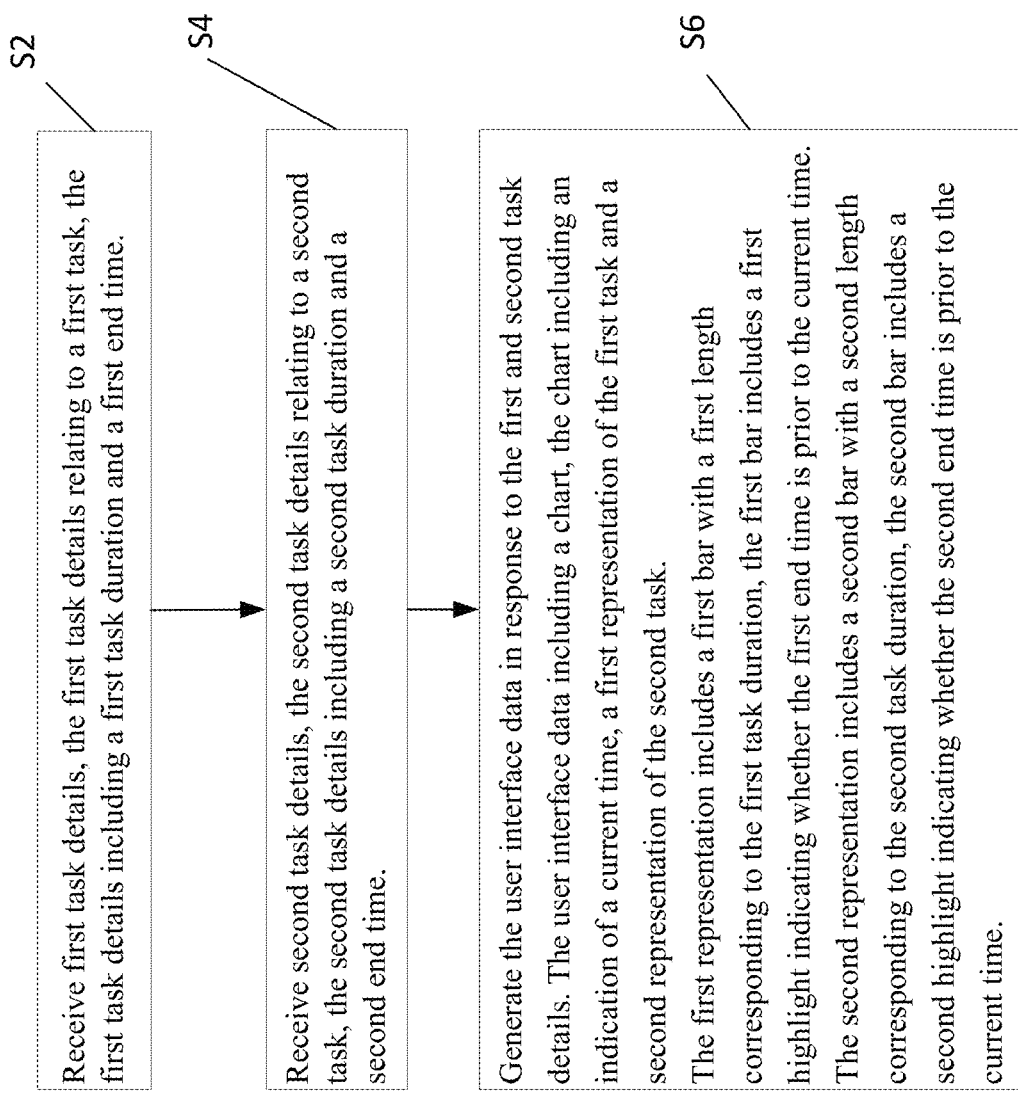

USER INTERFACE FOR TASK MANAGEMENT

BACKGROUND OF THE INVENTION

Workflow management systems may be used in assisting managing processes. Each process may include one or more types of tasks. These systems may include displays including information such as priority of tasks, due dates, etc. This disclosure describes an improvement over prior art systems.

SUMMARY

In some examples, a method for generating user interface data effective to display representations of tasks is generally described. The method may include, by a processor, receiving first task details, the first task details relating to a first task, the first task details including a first end time. The method may include receiving second task details, the second task details relating to a second task, the second task details including a second end time. The method may include generating the user interface data in response to the first and second task details. The user interface data may include a chart. The chart may include an indication of a current time, a first representation of the first task and a second representation of the second task. The first representation includes a first bar with a first highlight indicating whether the first end time is prior to the current time. The second representation includes a second bar with a second highlight indicating whether the second end time is prior to the current time.

In some examples, a device effective to generate user interface data is generally described. The user interface data may be effective to display representations of tasks. The device may include a memory including instructions and a processor in communication with the memory. The processor may be effective to receive first task details, the first task details relating to a first task, the first task details including a first task duration and a first end time. The processor may be effective to receive second task details, the second task details relating to a second task, the second task details including a second task duration and a second end time. The processor may be effective to generate the user interface data in response to the first and second task details. The user interface data may include a chart. The chart may include an indication of a current time, a first representation of the first task and a second representation of the second task. The first representation includes a first bar with a first length corresponding to the first task duration. The first bar includes a first highlight indicating whether the first end time is prior to the current time. The second representation includes a second bar with a second length corresponding to the second task duration. The second bar includes a second highlight indicating whether the second end time is prior to the current time.

In some examples, a processor generated user interface on a display is generally described. The user interface may include an indication of a current time. The user interface may include a first representation of a first task. The first representation may include a first bar with a first length corresponding to a first task duration, the first bar includes a first highlight indicating whether the first end time is prior to the current time. The user interface may include a second representation of a second task. The second representation may include includes a second bar with a second length corresponding to a second task duration, the second bar includes a second highlight indicating whether the second end time is prior to the current time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 is a flow chart illustrating a process which may be performed in accordance with an embodiment of the invention.

DETAILED DESCRIPTION

Figure 1:
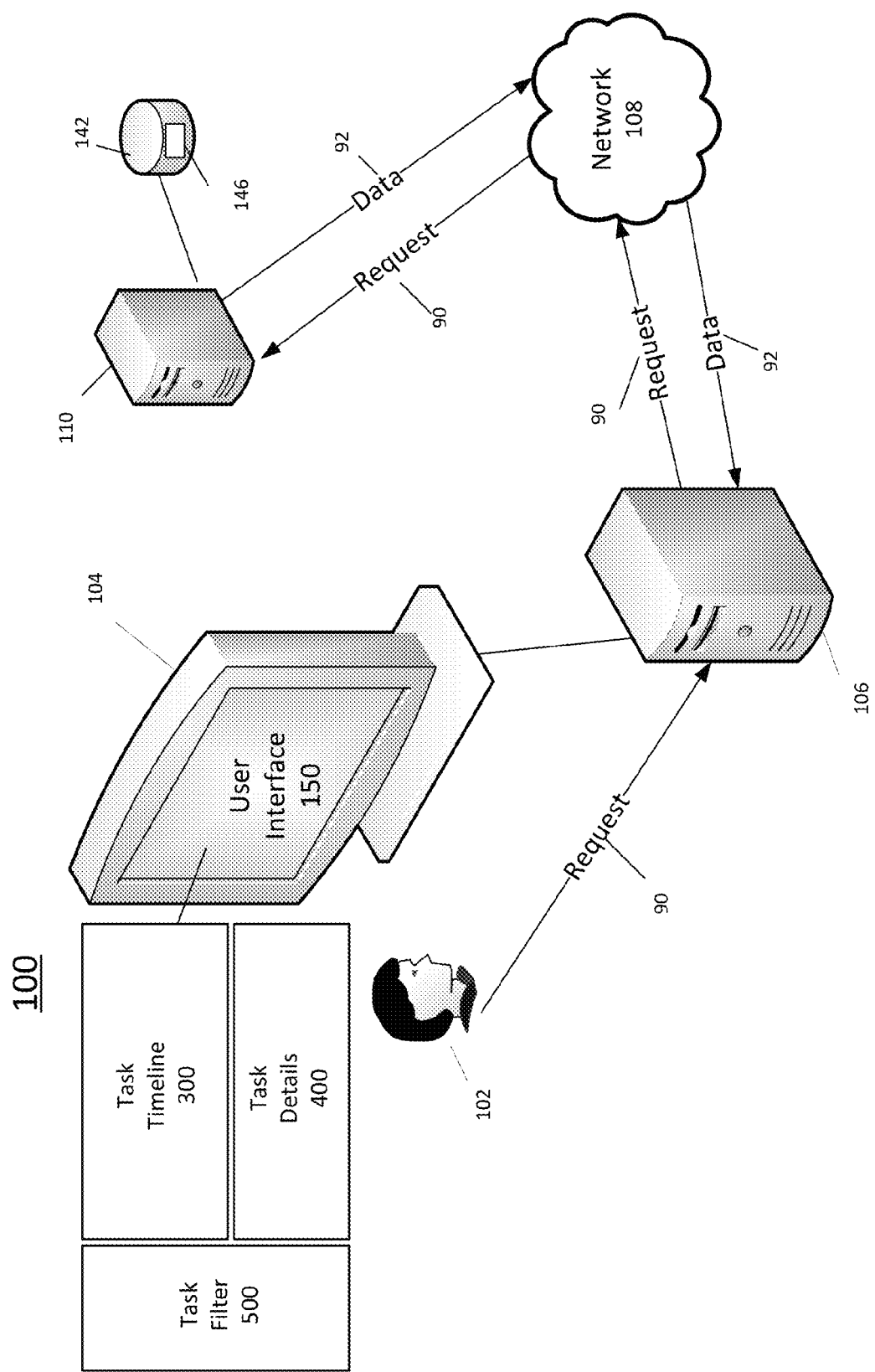
FIG. 1 is a system drawing of a system in accordance with an embodiment of the invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a system drawing of a system in accordance with an embodiment of the invention. An example system 100 may include a display 104, a processor 106, a network 108 and/or a server 110. Server 110 may be a database server and/or may include a memory 142. Memory 142 may include instructions 146. Display 104 may be configured in communication with processor 106. Processor 106 may be configured in communication with server 110 over network 108. Network 108 may be, for example, the Internet or a local area network (LAN). Processor 106 may display a user interface 150 on display 104 in response to data 92 received from server 110.

User 102 may send request 90 to processor 106 to create, read and/or modify data stored in memory 142. For example, users may enter task details relating to tasks to be performed by one or more users. The task details may be stored in memory 142. Users may then request to view and/or modify details relating to stored tasks. For example, users may request that tasks be displayed on user interface 150 on display 104. User interface 150 may include modules such as a task filter 500, a task timeline 300 and task details 400. These modules are explained in more detail below. One or more of task filter module 500, task timeline module 300 and task details module 400 may be displayed on user interface 150 at the same time.

Modifications may include creating, modifying, and/or deleting task data in memory 142. Upon receiving request 90, processor 106 forwards request to server 110. Server 110 processes request 90 and sends user interface data 92 to processor 106 through network 108 in response. Processor 106 may receive user interface data 92, and generate user interface 150 based on data 92. Data 92 may be html (hypertext transfer protocol) data and may be rendered by a processor 106 running a browser program.

Figure 2:
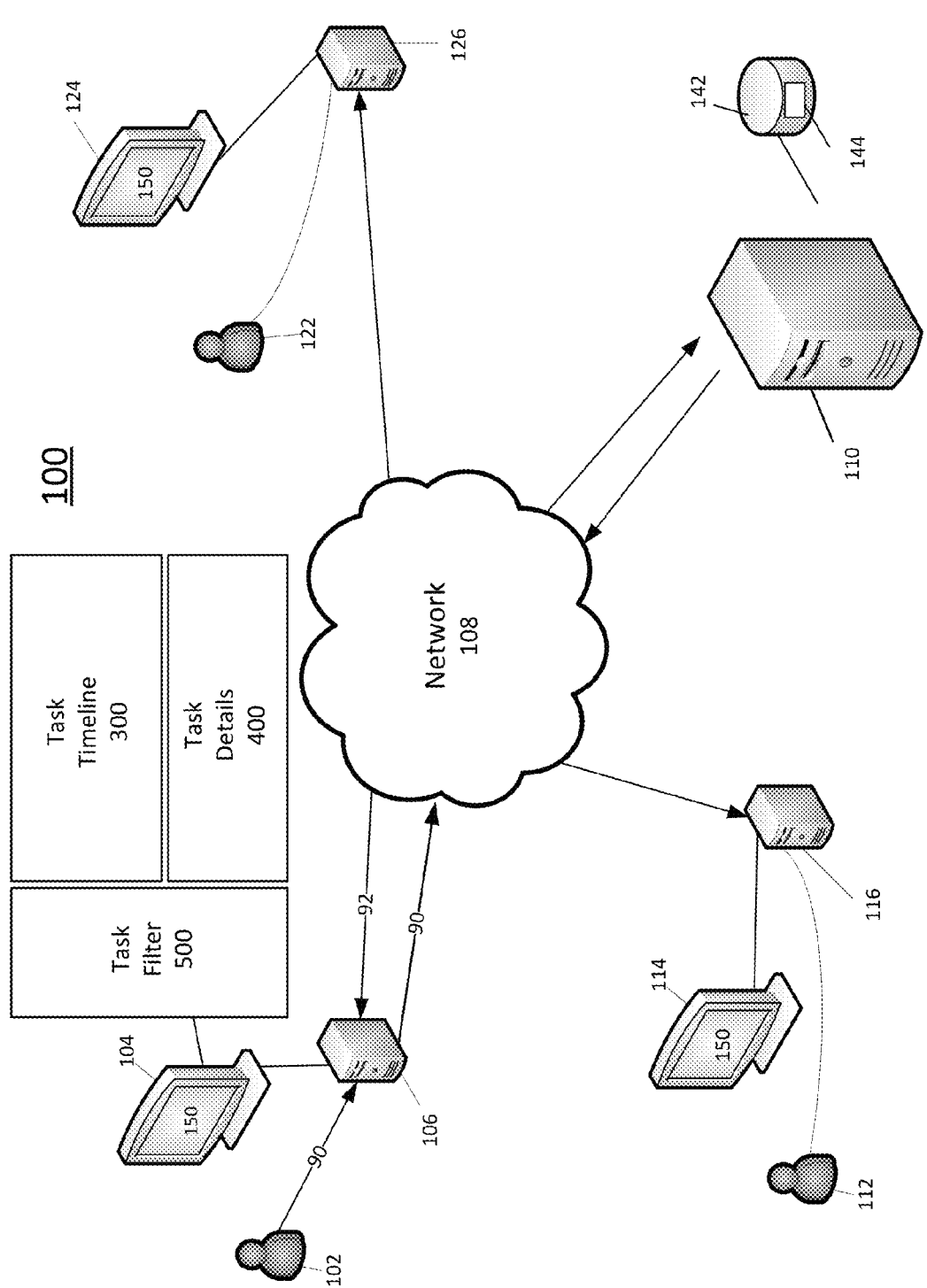
FIG. 2 is a system drawing of a system in accordance with an embodiment of the invention.

FIG. 2 is a system drawing of a system in accordance with an embodiment of the invention. In addition to the components in FIG. 1, system 100 may include displays 114 and 124, and/or processors 116 and 126. Processors 106, 116, 126 and server 110 may be configured in communication with each other over network 108. Display 114 may be configured in communication with processor 116. Processor 116 may be configured in communication with server 110 over network 108. Processor 116 may display user interface 150 to a user 112 on display 114. Display 124 may be configured in communication with processor 126. Processor 126 may be configured in communication with server 110 over network 108. Processor 126 may display user interface 150 on display 124 for a user 122. Any one of users 102, 112, 122 may create a task in memory 142. An entered task may then be available for viewing by other users though user interface 150.

Figure 3:
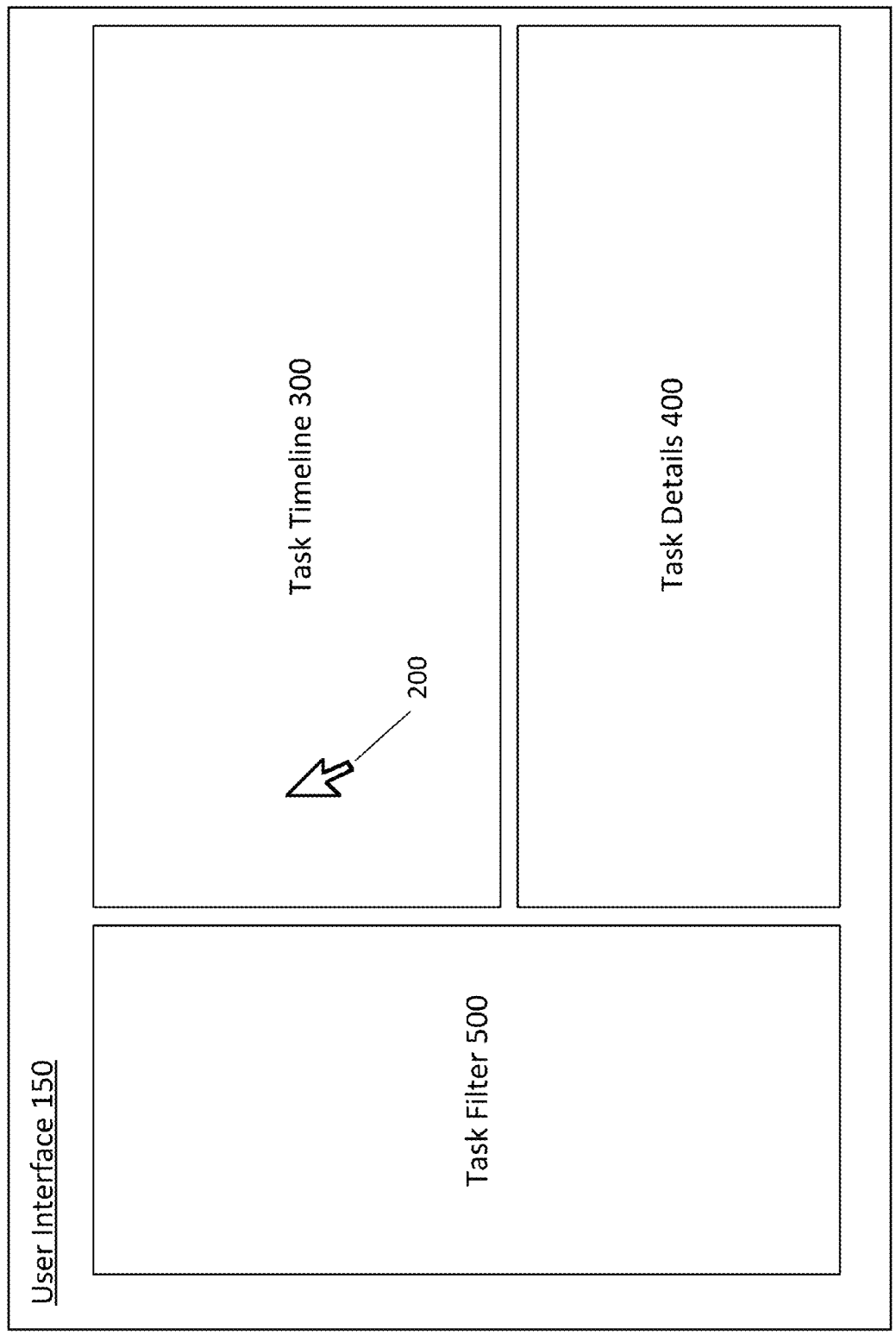
FIG. 3 is a drawing illustrating a user interface in accordance with an embodiment of the invention.

FIG. 3 is a drawing illustrating a user interface 150 in accordance with an embodiment of the invention. User interface 150 may include modules including a task timeline module 300, task details module 400, and/or a task filter module 500. Modules 300, 400, and/or 500 may display data from memory 142. A pointer 200 may be used by one or users 102, 112, and/or 122 for navigation within modules of user interface 150. Movement of pointer 200 may be controlled by an input device, such as computer mouse, keyboard, touch screen input, etc.

Figure 4:
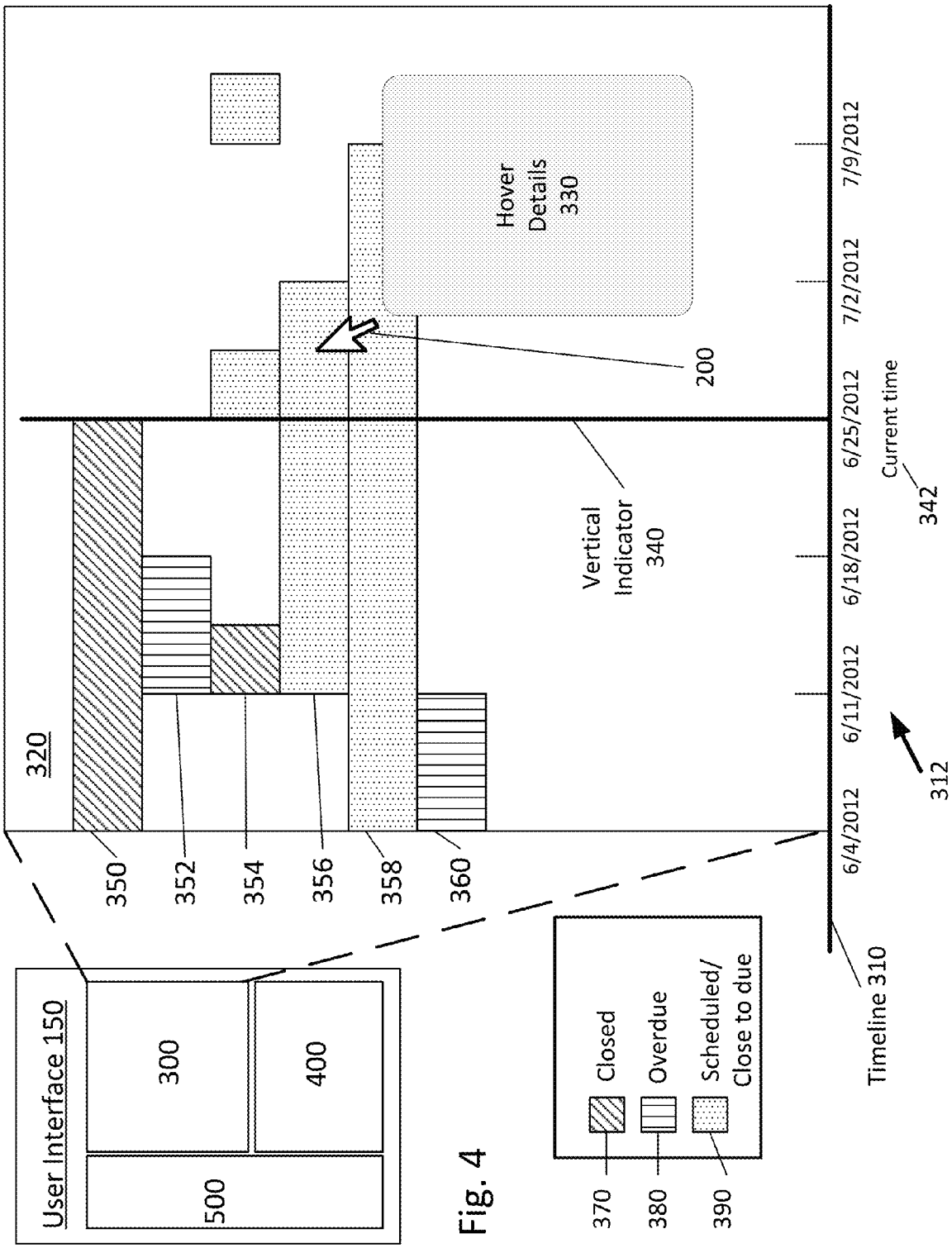
FIG. 4 is a drawing illustrating more detail of one of the modules of the user interface of FIG. 3.

FIG. 4 is a drawing illustrating more detail of task timeline module 300 of the user interface 150. Task timeline module 300, generated by server 110, may include a timeline 310 and/or a chart 320. Timeline 310 may include time units 312 and a current time indicator 342. Each time unit 312 may be separated by the same time interval. In the example shown, time units 6/4/2012, 6/11/2012, 6/18/2012, 6/25/2012, 7/2/2012, and 7/9/2012 are separated by a 7 day time interval. Time units 312 on timeline 310 could be represented as times in a day and/or dates.

Chart 320 may include visual representations of tasks 350, 352, 354, 356, 358, and/or 360. A process to be performed by one or more users may include one or more tasks. A task may be scheduled to be performed more than once at multiple different times as shown for example, for representation of task 354. A vertical indicator 340 may be located within the boundaries of chart 320 and may point to current time indicator 342. Server 110 may move time units 312, current time indicator 342 and vertical indicator 340 in chart 320 so that a position of current time indicator 342 and vertical indicator 340 indicates a current time and/or date in timeline 310.

Representations of tasks may be displayed as bars. A scheduled starting time of a task may be indicated by the position of the left edge of the task's bar. A scheduled end time of a task may be indicated by the position of the right edge of the task's bar. A length between the left edge and right edge of the visual representation of a task may represent an estimated duration of the task.

Representations of tasks 350, 352, 354, 356, 358 in chart 320 may be highlighted such as by a color or shading. Each color or shade represents a unique status. For example, shade 370 indicates a task is "closed", meaning the task is completed. Shade 380 indicates a task is "overdue", meaning the end time for the task is prior to the current time. Shade 390 indicates a task is either "scheduled" and/or "close to due". "Scheduled" may mean that a start time for the task is scheduled to start at a time later than the current time. "Close to due" may mean that a task has already started and the scheduled task end time for the task is later than the current time. A status of representations of tasks may be updated in response to time passing and a change of current time indicator or a position of vertical indicator 340.

Representations of tasks may be displayed at a location in chart 320 based on a due date. For example, tasks with an end time at the end of a first week may be placed higher on a y axis of chart 320 than tasks with an end time by the end of a second week. By altering a location of a display of representations of tasks in chart 320, a user can quickly see what tasks are due or overdue.

Pointer 200 hovering at a particular location for over a threshold time period may be processed by processor 106 to generate hover details 330. For example, processor 106 (FIG. 2) may use a JavaScript plug in to monitor an x, y location of pointer 200 and send request 90 to server 110 (FIG. 2) requesting additional information relating to the representation of the task at the x,y location. Server 110 may receive the request and generate modified data 92 in response. Modified data 92 may include hover details 330.

Hover details 330 may include information relating to a task such as title, status, owner, assignee, type, date created and/or date due. Title may be a title of the task. Status may be a status of the task such as closed, overdue, scheduled, or close to due. Owner may be the user who created the task. Assignee may be the user who is supposed to perform the task. Type may be a category assigned to the task. Date created may be the date that the task was created in memory 142. The due date may be the end date when the task should be completed.

In an example, current time indicator 342 and vertical indicator 340 indicates a current time of 6/25/2012. Representations of tasks that have an end time on or before 6/25/2012 may be shaded in shades 370 or 380, indicating respective statuses either closed or overdue. Representations of tasks 356 and 358 are shaded in shade 390, indicating they are scheduled and/or close to due.

Figure 5:
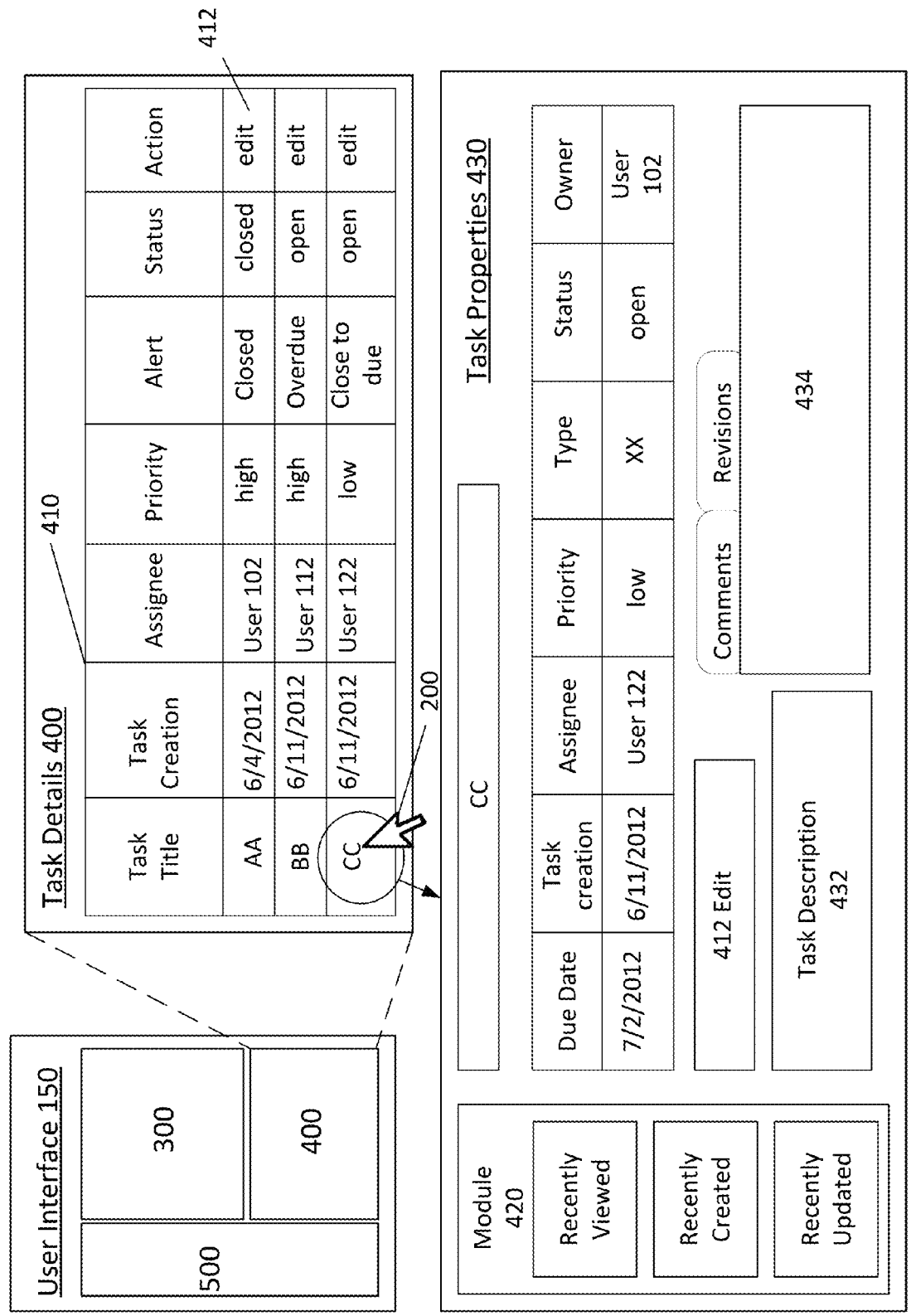
FIG. 5 is a drawing illustrating more detail of one of the modules of the user interface of FIG. 3.

FIG. 5 is a drawing illustrating more detail of task details module 400 of the user interface 150 in accordance with an embodiment of the invention. Task details module 400 may include a table 410 that may include data from memory 142 relating to tasks. Table 410 may include fields such as a task title, a task creation date, assignee, priority, alert, status and/or action. Table 410 may further include an action column including edit buttons 412. Task title in table 410 may be a title associated with a task. The task creation date field may include information relating to when the task was first created in memory 142. The assignee may be the user who has been assigned to complete a task. Priority may reflect an importance level of the task and may have a status of "high", "medium", and/or "low". Data in the alert field may indicate a status of the task as discussed above with reference to FIG. 4. Data in the status field may indicate either "open" or "closed". For example, a task with an "open" status may relate to tasks that have an overdue, scheduled, and/or close to due status. A task with a closed status may relate to a completed task. The action field may include an "edit" button. When "edit" is selected for a particular task, a user with privileges may be allowed to modify data in memory 142 relating to the particular task.

Task titles may include hyperlinks so that clicking on a respectively task title may generate request 90 requesting server 110 to display another user interface including task properties module 430 on display 104. In an example, user 102 may request to view details of the task with the title CC. User 102 may control pointer 200 to navigate to task CC's title and click the hyperlink. In response to clicking on the hyperlink, server 110 may send modified data 92 to display a user interface including task properties module 430 on display 104.

Task properties module 430 may include data fields associated with task CC such as due date, task creation date, assignee, priority, type, status or owner. Task properties module 430 may also include a task description frame 432 and a comments and/or revisions frame 434. Task description frame 432 may include a description of the selected task. Comments and/or revisions frame 434 may include comments and/or revisions input by any user. For example, comments may indicate why certain tasks were completed or not completed. Revisions may indicate how the task has been modified over time. For example, revisions may indicate that a due date has changed and an indication why the due date has changed. Selection of a "comments" tab may result in display of any user comments in frame 434. Selection of a "revisions" tab may result in display any revisions entered by any user in frame 434. Task properties module 430 may further include module 420. Module 420 may include options which allow users to select recently viewed tasks, recently created tasks, and/or recently updated tasks.

Figure 6:
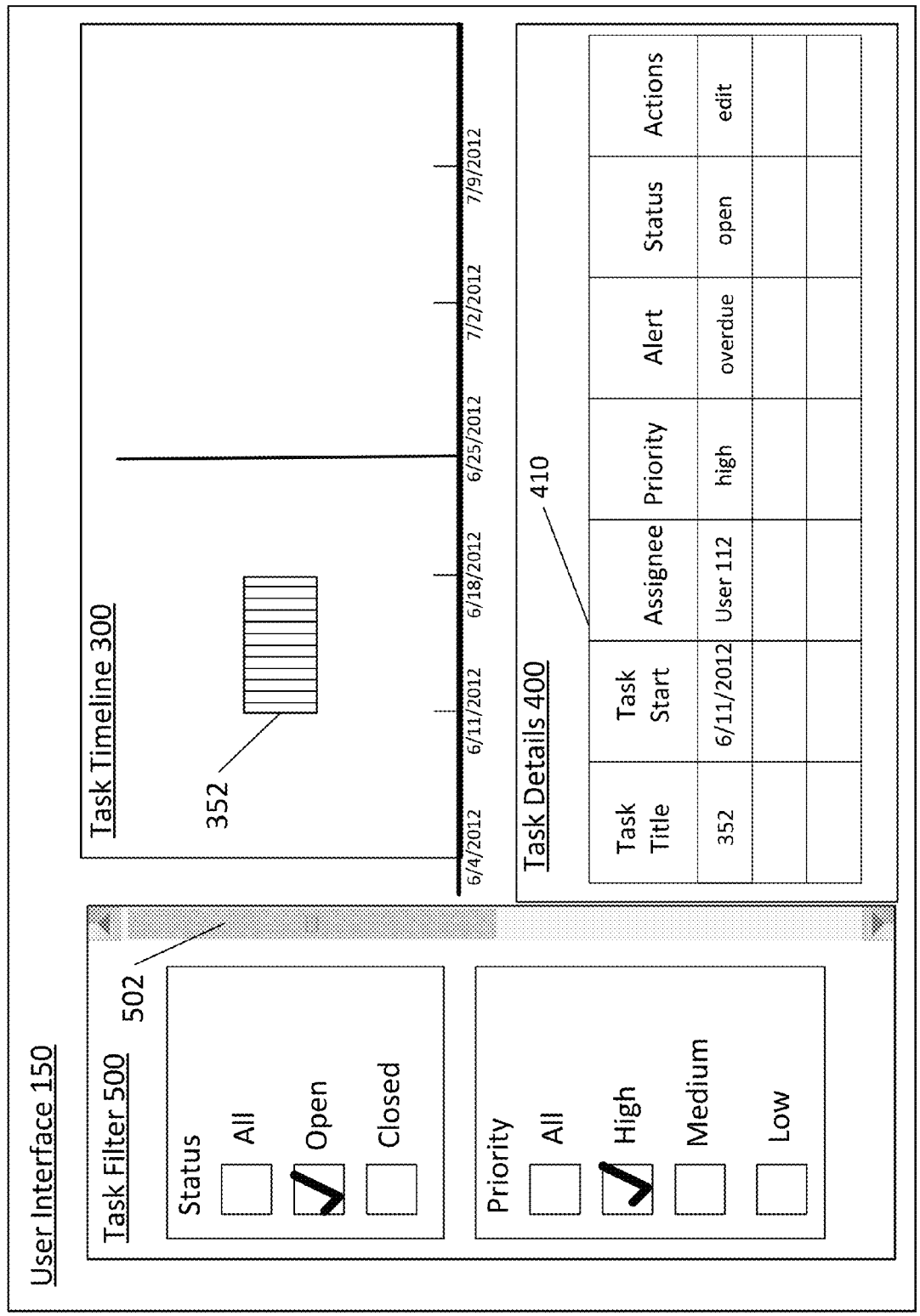
FIG. 6 is a drawing illustrating more detail of one of the modules of the user interface of FIG. 3.

FIG. 6 is a drawing illustrating more detail of one of the modules of the user interface of FIG. 3. Task filter module 500 may allow a user to filter the data that is displayed on user interface 150. Task filter module 500 may include fields from table 410 (FIG. 5) and/or module 430 (FIG. 5). Fields in module 500 may include filter options. In the example shown, the fields status and priority are available for a user to filter data in user interface 150. Data displayed in modules 300 and/or 400 may be updated based on selections made within task filter module 500. Selections in module 500 made be represented as check boxes. Module 500 may include a scroll bar 502. Scroll bar 502 may provide a user interface allowing a user to view additional filter fields and/or options.

In the example shown, user 102 may request to see tasks that have a status of open and a priority of high. User 102 may control pointer 200 to make selections within module 500 indicating tasks with a status of open an a priority of high. User 102 may select the status "open" under the field status and "high" under the field priority. When user 102 finishes selecting the options in module 500, tasks with matching criteria may be displayed. In the example, task 352 is the only task that meets the selected criteria, and task 352 is displayed in modules 300 and 400.

Among other potential benefits, users may use the described system to prioritize tasks that need to be performed in a process. Users can visualize tasks that are due among many available tasks outstanding. Reports may be generated such as a number of tasks completed in a time period or which are still open for a particular user. In a search engine optimization context, it may be desired to implement many small tasks. A system in accordance with the disclosure may be used to assist users in keeping track of what tasks need to be done and an order of those tasks.

FIG. 7 is a flow chart illustrating a process which may be performed in accordance with an embodiment of the invention. The process may generate user interface data effective to display representations of tasks. At step S2, a processor may receive first task details, the first task details relating to a first task, the first task details including a first task duration and a first end time. At step S4, a processor may receive second task details, the second task details relating to a second task, the second task details including a second task duration and a second end time.

At step S6, the processor may generate the user interface data in response to the first and second task details. The user interface data may include a chart. The chart may include an indication of a current time, a first representation of the first task and a second representation of the second task. The first representation may include a first bar with a first length corresponding to the first task duration, the first bar includes a first highlight indicating whether the first end time is prior to the current time. The second representation may include a second bar with a second length corresponding to the second task duration, the second bar includes a second highlight indicating whether the second end time is prior to the current time. The highlight may include a color or shading. The chart may include a current time indicator and time units.

The process may further include a request to display additional information about the first task. The request may be received by a pointer hovering over the first representation. The user interface data may be modified such as to generate a pop up window including the additional information.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating user interface data effective to display representations of tasks, the method comprising, by a processor:
receiving first task details, the first task details relating to a first task, the first task details including a first end time;
receiving second task details, the second task details relating to a second task, the second task details including a second end time; and
generating the user interface data in response to the first and second task details, the user interface data including a chart, the chart including an indication of a current time, a first representation of the first task and a second representation of the second task; wherein
the first representation includes a first bar with a first highlight indicating whether the first end time is prior to the current time;
the second representation includes a second bar with a second highlight indicating whether the second end time is prior to the current time.

2. The method of claim 1, wherein the first highlight includes a color or shading different from the second highlight.

3. The method of claim 1, further comprising:
receiving third task details, the third task details relating to a third task, the third task details including a third end time;
wherein:
the first task details include a first task duration;
the second task details include a second task duration;

the third task details include a third task duration;
the chart includes a third representation, where the third representation includes a third bar with a third length corresponding to the third task duration, and the third bar includes a third highlight indicating that the third task is closed;
the first bar includes a first length corresponding to the first task duration; and the second
bar includes a second length corresponding to the second task duration.

4. The method of claim 1, wherein the chart includes a current time indicator.

5. The method of claim 1, wherein the chart includes time units and a current time indicator.

6. The method of claim 1, further comprising:
receiving a request to display additional information about the first task; and
modifying the user interface data to cause display of the additional information about the first task.

7. The method of claim 6, wherein the additional information includes one or more of title, status, owner, assignee, type, date created or date closed.

8. The method of claim 7, wherein the user interface data includes data effective to generate a pop up window on the display including the additional information.

9. The method of claim 6, wherein the request is generated in response to a pointer hovering over the first representation for a threshold period of time.

10. The method of claim 1, wherein a left edge of the first bar represents a start time of the first task and a right edge of the first bar represents the end time of the first task.

11. The method of claim 1, wherein the user interface data includes the chart and a task detail module, and the method further comprises:
causing display of at least some of the first task details of the first task in the task details module;
causing display of at least some of the second task details of the second task in the task details module; and
receiving a request to display additional information about the first task, wherein the request to display additional information is generated in response to a pointer hovering over the first representation for a threshold period of time.

12. The method of claim 1, wherein the user interface data includes the chart and a task detail module, and the method further comprises:
causing display of at least some of the first task details of the first task in the task details module;
causing display of at least some of the second task details of the second task in the task details module;
receiving a request to display additional information about the first task, wherein the request to display additional information is generated in response to a pointer hovering over the first representation for a threshold period of time;
modifying the user interface data to cause display of the additional information about the first task, wherein the additional information includes one or more of title, status, owner, assignee, type, date created or date closed; and
causing a pop up window to display on the display including the additional information.

13. The method of claim 1, further comprising:
receiving a request to display additional information about the first task; and
modifying the user interface data to generate a user interface including the additional information about the first task.

14. The method of claim 1, further comprising:
receiving a request to display additional information about the first task; and
modifying the user interface data to generate a user interface including the additional information about the first task and comments and/or revisions relating to the first task.

15. The method of claim 1, wherein the user interface includes the chart, a task details module including information about the first and the second task, and a task filter module, the task filter module effective to receive input from a user to filter details to be displayed in the chart and the task details module.

16. A device effective to generate user interface data, the user interface data effective to display representations of tasks, the device comprising:
a memory including instructions;
a processor in communication with the memory, the processor effective to
receive first task details, the first task details relating to a first task, the first task details including a first task duration and a first end time;
receive second task details, the second task details relating to a second task, the second task details including a second task duration and a second end time; and
generate the user interface data in response to the first and second task details, the user interface data including a chart, the chart including an indication of a current time, a first representation of the first task and a second representation of the second task;
wherein
the first representation includes a first bar with a first length corresponding to the first task duration, the first bar includes a first highlight indicating whether the first end time is prior to the current time;
the second representation includes a second bar with a second length corresponding to the second task duration, the second bar includes a second highlight indicating whether the second end time is prior to the current time.

17. The device of claim 16, wherein the first highlight includes a color or shading different from the second highlight.

18. The device of claim 16, wherein the user interface data includes the chart and a task detail module, and the processor is further effective to:
cause display of at least some of the first task details of the first task in the task details module;
cause display of at least some of the second task details of the second task in the task details module;
receive a request to display additional information about the first task, wherein the request to display additional information is generated in response to a pointer hovering over the first representation for a threshold period of time;
modify the user interface data to cause display of the additional information about the first task, wherein the additional information includes one or more of title, status, owner, assignee, type, date created or date closed; and
cause the display to display a pop up window on the display including the additional information.

19. A non-transitory computer readable medium that is effective to generate a user interface on a display, the user interface comprising:

an indication of a current time;

a first representation of a first task, the first representation includes a first bar with a first length corresponding to a first task duration, the first bar includes a first highlight indicating whether the first end time is prior to the current time;

a second representation of a second task, the second representation includes a second bar with a second length corresponding to a second task duration, the second bar includes a second highlight indicating whether the second end time is prior to the current time.

20. The non-transitory computer readable medium of claim 19, wherein the first highlight includes a color or shading different from the second highlight.

* * * * *